United States Patent
Thomas et al.

(10) Patent No.: US 11,096,047 B2
(45) Date of Patent: Aug. 17, 2021

(54) METHODS AND SYSTEMS FOR SCTP PROBING

(71) Applicant: LGS Innovations LLC, Herndon, VA (US)

(72) Inventors: Tavaris Jason Thomas, New Providence, NJ (US); Larsen David Fisch, Randolph, NJ (US); Christian Benitez, Union City, NJ (US); Nicholas Noga, Randolph, NJ (US); Steven Michael Kropac, Livingston, NJ (US)

( * ) Notice: Subject to any disclaimer, the term of this patent is extended or adjusted under 35 U.S.C. 154(b) by 339 days.

(21) Appl. No.: 16/201,395

(22) Filed: Nov. 27, 2018

(65) Prior Publication Data
US 2020/0169878 A1 May 28, 2020

(51) Int. Cl.
| | |
|---|---|
| H04W 12/06 | (2021.01) |
| H04W 8/00 | (2009.01) |
| G06F 16/28 | (2019.01) |
| H04L 29/06 | (2006.01) |
| G06F 16/24 | (2019.01) |
| H04W 80/06 | (2009.01) |

(52) U.S. Cl.
CPC ........... *H04W 12/06* (2013.01); *G06F 16/24* (2019.01); *G06F 16/285* (2019.01); *H04L 63/0876* (2013.01); *H04L 63/1425* (2013.01); *H04W 8/005* (2013.01); *H04W 80/06* (2013.01)

(58) Field of Classification Search
CPC .................................................. H04W 12/06
See application file for complete search history.

(56) References Cited

U.S. PATENT DOCUMENTS

| | | | |
|---|---|---|---|
| 8,116,203 B2 * | 2/2012 | Kadambi | H04L 47/6215 370/235 |
| 9,237,167 B1 * | 1/2016 | Manion | H04L 69/22 |
| 9,430,646 B1 * | 8/2016 | Mushtaq | H04L 63/1425 |
| 2002/0133607 A1 * | 9/2002 | Nikander | H04L 63/0823 709/229 |
| 2007/0047457 A1 * | 3/2007 | Harijono | H04L 63/1416 370/250 |
| 2007/0280106 A1 * | 12/2007 | Lund | H04L 63/1416 370/230 |
| 2007/0280111 A1 * | 12/2007 | Lund | H04L 47/30 370/235 |
| 2008/0096562 A1 * | 4/2008 | Wu | H04L 69/163 455/436 |
| 2011/0058549 A1 * | 3/2011 | Harel | H04L 47/31 370/390 |
| 2011/0238822 A1 * | 9/2011 | Weniger | H04W 80/045 709/224 |
| 2013/0080573 A1 * | 3/2013 | Boliek | H04L 63/08 709/217 |
| 2014/0033310 A1 * | 1/2014 | Cheng | H04L 63/1408 726/23 |

(Continued)

*Primary Examiner* — Simon P Kanaan
(74) *Attorney, Agent, or Firm* — BakerHostetler

(57) ABSTRACT

The application describes a method for mapping nodes of a network using Stream Control Transmission Protocol (SCTP) probing. Packets are sent to open ports of the nodes. Response packets are received from the nodes. Signatures are generated using headers of the response packets. The nodes are classified using the signatures. The node are mapped to elements of the network using the signatures. Rogue devices may be detected based on the mapped nodes.

20 Claims, 13 Drawing Sheets

(56) References Cited

U.S. PATENT DOCUMENTS

| | | | | |
|---|---|---|---|---|
| 2014/0129714 | A1* | 5/2014 | Hamdi | H04L 47/82 |
| | | | | 709/226 |
| 2017/0344987 | A1* | 11/2017 | Davis | G06F 16/9535 |
| 2019/0311357 | A1* | 10/2019 | Madisetti | G06Q 20/3829 |
| 2020/0342129 | A1* | 10/2020 | Chaiken | G06F 21/602 |

* cited by examiner

FIG. 9

Table 910a:

| ARWC | NOS | NIS |
|---|---|---|
| 106496 | 2 | 2 |
| 32768 | 10 | 2048 |
| 487666 | 36 | 26 |
| 34525 | 154 | 67 |
| 86087 | 746 | 2685 |

Table 910b:

| ARWC | NOS | NIS |
|---|---|---|
| 106496 | 2 | 2 |
| 32768 | 10 | 2048 |
| 487666 | 36 | 26 |
| 34525 | 154 | 67 |
| 86087 | 746 | 2685 |
| 247573 | 15 | 562 |

US 11,096,047 B2

METHODS AND SYSTEMS FOR SCTP PROBING

BACKGROUND

Stream Control Transmission Protocol (SCTP) is a reliable transport protocol that provides acknowledged error, non-duplicated transfer of data. SCTP has experienced growing popularity, as it provides many of the features of TCP and UDP, such as reliable, in-sequence transport of data with congestion control, while offering increased resilience and reliability through multi-homing and redundant paths. Security, such as encryption and authentication, was not initially designed into SCTP. The need to integrate security into SCTP has recently been recognized.

Systems fingerprinting methods, such as that implemented by Network Mapper (Nmap), are used to discover elements of a computer network. Systems fingerprinting methods can be used to detect attempted network attacks, resource attacks, and/or denial of service (DoS) attacks, such as connection setup flooding, by rogue devices. Systems fingerprinting methods can also be used to identify points of vulnerability in networks. As the adoption of SCTP increases, there is a need for a systems fingerprinting method that is compatible with SCTP. However, at present, no such method exists.

SUMMARY

This Summary is provided to introduce a selection of concepts in a simplified form that are further described below in the Detailed Description. This Summary is not intended to limit the scope of the claimed subject matter. The foregoing needs are met, to a great extent, by the present application directed to a process and system for SCTP probing.

In one aspect of the application, a port of a node of a network is probed. The port may be probed by sending an SCTP packet to the port. In response to the probe, a packet may be received from the port. The packet may include headers. A signature may be generated for the probe using the headers. The node may be classified, such as based on the behavior of functions of the node. The signature and/or the classification may be stored in a database, such as a database of the nodes of the network. The database may be used to authenticate the node. Additionally, rogue devices may be detected using the database.

There has thus been outlined, rather broadly, certain embodiments of the invention in order that the detailed description thereof may be better understood, and in order that the present contribution to the art may be better appreciated.

BRIEF DESCRIPTION OF THE DRAWINGS

Aspects of the described methods and systems for SCTP probing are described more fully herein with reference to the accompanying drawings, in which example embodiments are shown. In the following description, for purposes of explanation, numerous specific details are set forth in order to provide an understanding of the various embodiments. However, the instant disclosure may be embodied in many different forms and should not be construed as limited to the example embodiments set forth herein. Like numbers refer to like elements throughout. In the drawings:

FIG. 9 illustrates a blacklist according to an embodiment of the application.

DETAILED DESCRIPTION

A detailed description of the illustrative embodiment will be discussed in reference to various figures, embodiments, and aspects herein. Although this description provides detailed examples of possible implementations, it should be understood that the details are intended to be examples and thus do not limit the scope of the application.

Reference in this specification to "one embodiment," "an embodiment," "one or more embodiments," "an aspect" or the like means that a particular feature, structure, or characteristic described in connection with the embodiment is included in at least one embodiment of the disclosure. Moreover, the term "embodiment" in various places in the specification is not necessarily referring to the same embodiment. That is, various features are described which may be exhibited by some embodiments and not by the other.

Stream Control Transmission Protocol (SCTP) is a protocol of the Transport Layer of the Open Systems Interconnection (OSI) Model. Similarly to User Datagram Protocol (UDP), SCTP is datagram orientated. Like Transmission Control Protocol (TCP), SCTP ensures reliable sequential transport of data with congestion control. SCTP uses multi-streaming, or the use of multiple IP address per SCTP endpoint, to transport data chunks or packets through different network paths. SCTP is an effective protocol for applications that require monitoring and session-loss detection, as SCTP path and session failure detection mechanism actively monitor the connectivity of the session.

Figure 1:
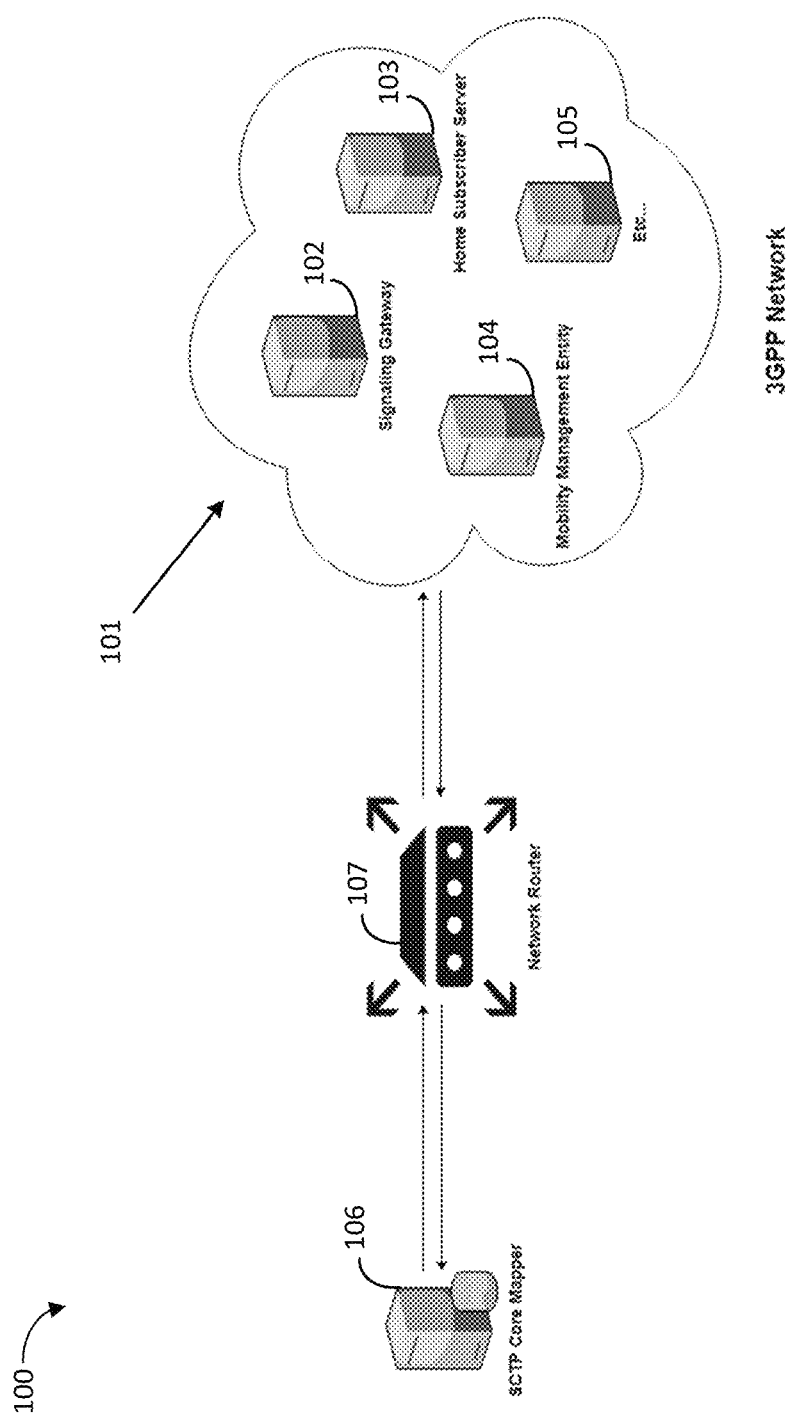
FIG. 1 illustrates a system according to an embodiment of the application.

A systems fingerprinting method may be used to discover elements of a network. Such methods may be used to detect attempted network attacks, such as by rogues devices. For example, based on determination of a rogue device, a security configuration of a network firewall may be modified to block data going to and/or from an SCTP port of the rogue device. The rogue device may be added to a list of rogue devices, such as a blacklist. The network may be monitored for the rogue devices. The rogue devices may be denied access to the network and/or other data. A request to establish an SCTP association with an SCTP endpoint from the rogue device may be denied. For example, an application programming interface, such as a socket interface, may deny the request to establish the association, such as based on a determination that the rogue device is listed in a blacklist. A request from the rogue device for a key needed to perform a handshake protocol, such as an SCTP 4-way handshake, may be denied. The present disclosure describes a systems fingerprinting method that is compatible with SCTP. FIG. 1 shows an example system 100. The system 100 may include a network 101. The network 101 may be a communications network, a computer network, a telephone network, and/or a data network. The network 101 may be a 3GPP network, a 3G network, or a 4G network.

The network 101 may include a plurality of nodes. The nodes may be client, server, router, switch, hub, and/or proxy devices. The nodes may include, as examples, a signaling gateway 102, a home subscriber server 103, a mobility management entity 104, and/or other computing devices 105.

The system 100 may include a Stream Control Transmission Protocol (SCTP) core mapper 106. The SCTP core mapper 106 may be in communication with one or more nodes of the network 101. For example, the SCTP more mapper 106 may be in communication with the network 101 via a network router 107.

The SCTP core mapper 106 may fingerprint the nodes of the network 101. According to an embodiment, the SCTP core mapper 106 may fingerprint the nodes by probing the nodes of the network 101. The SCTP core mapper 106 may actively probe the nodes, such as by using built-in probes to find common open SCTP ports on the nodes. The SCTP core mapper 106 may be set to scan all ports of the nodes. The SCTP core mapper 106 may scan the ports of the nodes to determine open ports.

Figure 2:
FIG. 2 illustrates a packet according to an embodiment of the application.

According to an embodiment, the SCTP core mapper 106 may actively probe the nodes of the network 101. Actively probing the network nodes may include probing one or more of the determined open ports. The SCTP core mapper 106 may probe the open ports via the network router 107. For example, the SCTP core mapper 106 may probe an open port by sending a packet to the open port. An SCTP packet may include multiple chunks. An SCTP chunk may be a unit of information within the SCTP packet. The chunk may contain user data (e.g., user data chunk). The chunk may contain SCTP control information (e.g., control chunk). The chunk may have its own header (e.g., chunk header). The SCTP packet may include a header. The SCTP packet may be encapsulated into an IP packet. FIG. 2 shows an example packet 200. The packet 200 may be a SCTP_INIT packet.

Figure 3:
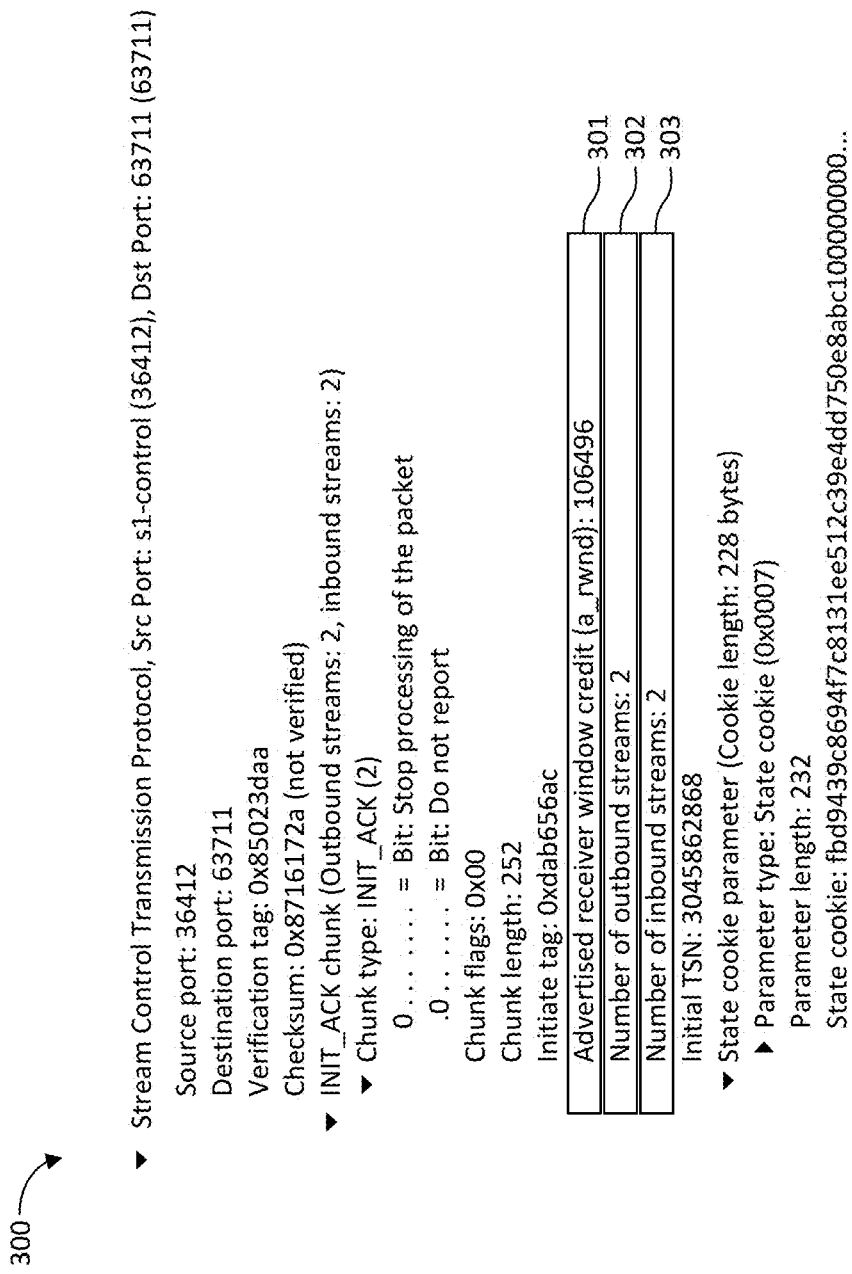
FIG. 3 illustrates a packet according to an embodiment of the application.

In response to the probing, the SCTP core mapper 106 may receive a response. The response may be a packet. FIG. 3 shows an example packet 300, which may be an INIT_ACK packet. The packet 300 may include one or more fields. The fields may include headers. The headers may include an Advertised Receiver Window Credit header 301. The Advertised Receiver Window Credit (a_rwnd, ARWC) may be a 32 bit unsigned integer. The Advertised Window Credit may be a value representing dedicated buffer space, such as in a number of bytes, a sender of the packet has reserved in association with a window. The Advertised Window Credit may indicate a buffer space that should not be lessened (e.g., taken away from the association) during a life of the association. An endpoint may change the value of the Advertised Window Credit of packets that it sends.

The headers may include a number of outbound streams header 302. The number of outbound streams (OS, NOS) may be a 16 bit unsigned integer. The number of outbound streams may define a number of outbound streams that a sender of the packet wishes to create in the association.

The headers may include a number of inbound streams header 303. The number of inbound streams (MIS, NIS) may be a 16 bit unsigned integer. The number of inbound streams may define a maximum number of streams that a sender of the packet allows a peer end to create in the association of the communication window.

According to an embodiment, the SCTP core mapper 106 may passively probe the nodes of the network 101. Passively probing the network nodes may include listening for communications from the network nodes. The SCTP core mapper 106 may listen to the network nodes via the network router 107. For example, the SCTP core mapper 106 may listen for communications via the network router in promiscuous mode. The SCTP core mapper 106 may monitor incoming SCTP packets (e.g., SCTP_INIT packets) from the network nodes. The packets may include fields. The fields may include headers, such as an Advertised Receiver Window Credit header, a number of outbound streams header, a number of inbound streams header, and/or a transmission sequence number (TSN). The transmission sequence number may be a 32 bit number. The transmission sequence number may be used internally by SCTP. The transmission sequence number may be attached to each chunk or packet containing user data, such as to permit a receiving SCTP endpoint to acknowledge receipt of the chunk or packet and/or to detect duplicate deliveries.

Figure 4:
FIG. 4 illustrates a classification of a node according to an embodiment of the application.

The SCTP core mapper 106 may generate a signature of one or more of the probed nodes of the network 101, such as example signature 400 shown in FIG. 4. The SCTP core mapper 106 may generate the signature 400 using one or more fields of the response packet 300, such as the headers 301, 302, 303 of the response packet 300. As an example, the signature 400 may include an indication of the Advertised Receiver Window Credit 401, an indication of the number of outbound streams 402, and/or an indication of the number of inbound streams 403 from the headers 301, 302, 303 of the response packet 300. The signature 400 may include an indication of whether the network node was probed passively or actively. For example, S1 may denote active probing and S2 may denote passive probing.

The SCTP core mapper 106 may store the signature 400. For example, the SCTP core mapper 106 may store the signature 400 in a database of nodes of the network 101. The SCTP core mapper 106 may store the signature 400 in the database based on a determination that the signature 400 is not in the database. The SCTP core mapper 106 may store the signature 400 in the database based on a determination that the node belongs to the network. The SCTP core mapper 106 may store the signature 400 in the database based on a classification of the node. Based on the signature 400 stored in the database, the SCTP core mapper 106 or another device may identify a node as being associated with the signature 400. Based on the node being associated with the signature 400, it may be determined that the node is the same node for which the signature 400 was originally generated.

The SCTP core mapper 106 may classify the probed nodes of the network 101. The SCTP core mapper 106 may classify the probed nodes based on their behavior in the network. The SCTP core mapper 106 may classify the probed nodes based on their function in the network 101. For example, a node may be classified as a signaling gateway (SG), a media gateway controller (MGC), a signaling end point (SEP), a signaling transfer point (STP), a base station, a home subscriber server, a mobile management entity, a transfer point, a packet data network (pdn) gateway, and/or an evolved packet core (EPC) device. For example, FIG. 4 shows a classification of a node as an EPC device. The SCTP core mapper 106 may classify the probed nodes based on a type of the network 101 of the nodes (e.g., 3GPP network, 3G network, 4G network). The SCTP core mapper 106 may classify the probed nodes based on an operating system (OS) of the probed nodes. The SCTP core mapper 106 may store the classification of the nodes, such as in a database of nodes of the network 101. The SCTP core mapper 106 may store the classification of the nodes with the signatures of the nodes, such as in the database of nodes of the network 101.

Figure 5:
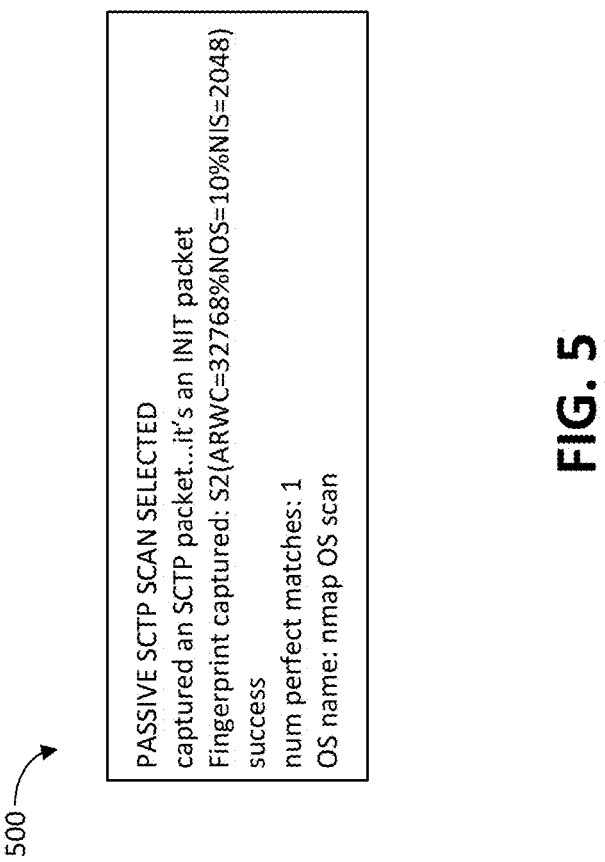
FIG. 5 illustrates a response to a database query according to an embodiment of the application.

The SCTP core mapper 106 or another device may perform a signature lookup using a database or generated node signatures and/or node classifications. Performing a signature lookup may include probing a node, such as using any of the methods discussed herein. A signature may be generated for the node based on the probing. The database may be queried using a generated signature. FIG. 5 shows an example response 500 to a database query. If the generated signature corresponds to a signature stored to the database, an indication of the node may be returned in response to the query. Signatures may correspond if they share a same field entry, such as data from a header of a packet. For example, the response 500 indicates that the signature had been previously generated for a node fingerprinted using an nmap OS scan. If a classification of the node is stored with the signature in the database, the classification of the node may be returned. An indication of the method used to probe (e.g., active probing, passive probing) the node may be returned. As an example, the response 500 indicates that a signature stored to the database corresponds to a generated signature submitted in a query. The response 500 indicates that the fingerprint was captured using a passive probing method (S2).

If the generated signature does not correspond to a signature stored to the database, the generated signature may be added to the database. If the network node is classified, the classification may be added to the database. An indication of the method used to fingerprint the node may be added to the database.

Node signature lookup may be used to bolster network security. For example, node signature lookup may provide a tool for detecting rogue devices, such as rogue access points and/or rogue peers. A rogue node may be determined based on lookup of a signature of the node. For example, a node may be probed passively and/or actively. Based on the probing, a signature may be generated for the node. A database of nodes of a network may be queried using the signature of the node. If the database does not contain a signature corresponding to the signature of the node, it may be determined that the node does not belong to the network, is not authorized to communicate with nodes of the network, and/or is not authorized to access data within the network. Based on the determination that the node is rogue, communications with the node or access granted to the node may be restricted and/or terminated. For example, a firewall may block communications to and/or from a rogue device and/or port of a rogue device. The rogue device may be added to a list of rogue devices, such as a blacklist. The network may be monitored for the rogue devices. The rogue devices may be denied access to the network and/or other data. For example, the rogue device may be denied a key needed to perform a handshake. Based on the determination that the node is rogue, an authority associated with the network, such as a network controller or service provider, may be notified of the node.

A Software Defined Networking (SDN) may have control rules that may dictate how certain types of traffic are to be handled. An SDN controller may be notified of the rogue node. The control rules may be modified, such as by the SDN controller, to include rules associated with traffic from the rogue node. The SDN may be monitored for the traffic from the rogue node. The control rules may be enforced, such as by causing the traffic from the rogue node to change path, changing resources associated with the traffic from the rogue node, and/or generating an alert indicative of the traffic from the rogue node.

Figure 6:
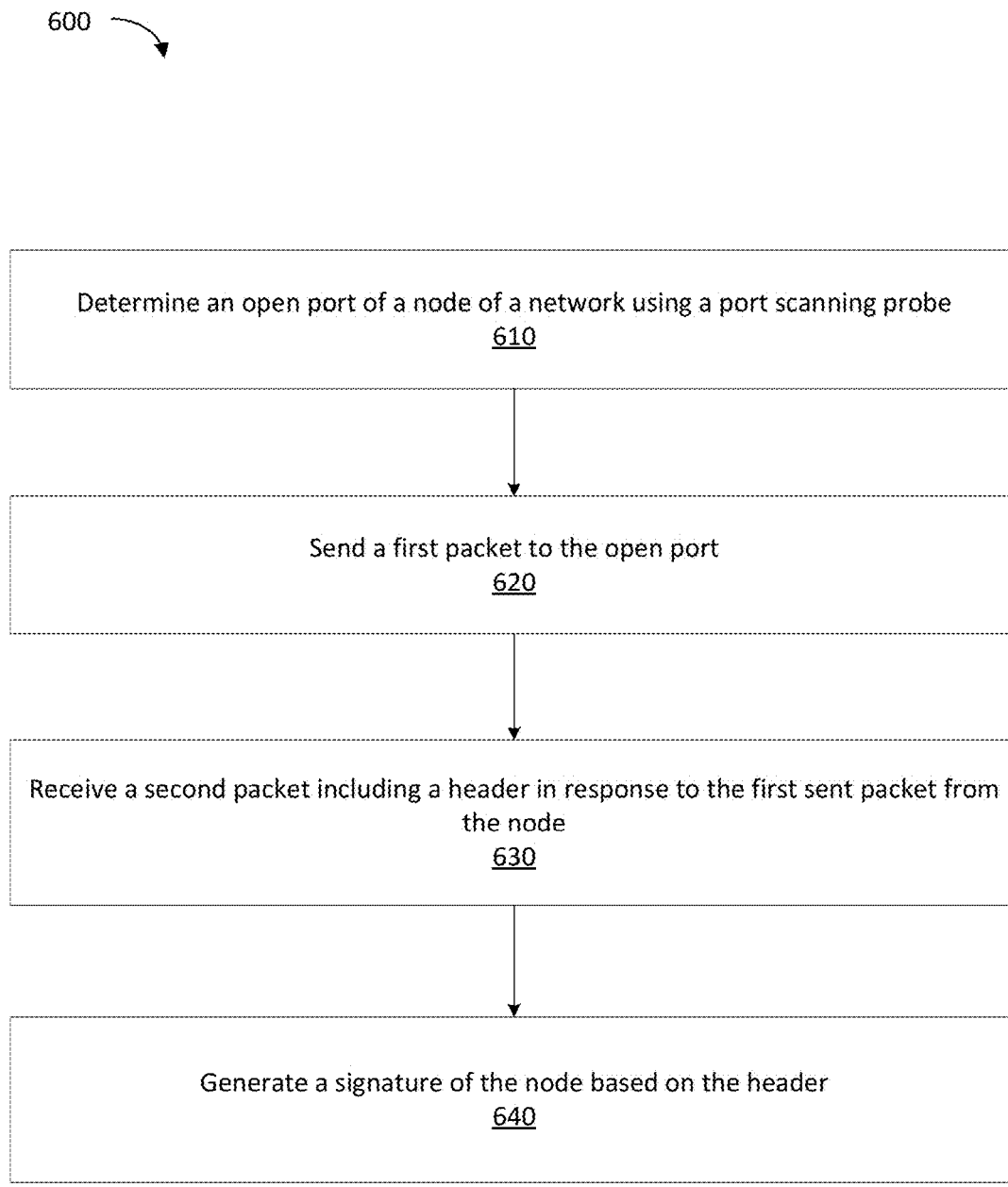
FIG. 6 illustrates a method according to an embodiment of the application.

FIG. 6 shows an example method 600. At step 610, an open port of a node of a network may be determined. The network 101 may be a communications network, a computer network, a telephone network, and/or a data network. The network 101 may be a 3GPP network, a 3G network, or a 4G network.

The open port of the node of the network may be determined by a mapper device (e.g., SCTP core mapper 106 in FIG. 1). The open port of the node of the network may be determined using a port scanning probe (e.g., an SCTP_INIT packet). The port scanning probe may be a packet sent to the port of the node. The open port of the node may be determined based on receiving a packet from the node, such as in response to the port scanning probe.

At step 620, a first packet may be sent to the open port of the node (e.g., an SCTP_INIT packet). At step 630, a second packet may be received from the node (e.g., an SCTP INIT_ACK packet). The second packet may be received in response to the first sent packet. The second packet may include fields. The fields may include a header. The header may be an Advertised Receiver Window Credit (a_rwnd, ARWC) header, a number of outbound streams header, a number of inbound streams header, and/or a transmission sequence number (TSN).

At step 640, a signature of the node may be generated (e.g., signature 400 in FIG. 4). The signature of the node may be generated based on the headers of the second packet. The signature may be stored in a database. The signature may be stored in the database based on a determination that the signature is not in the database.

The method 600 may further include classifying the node and/or the signature of the node. For example, a node may be classified as a signaling gateway (SG), a media gateway controller (MGC), a signaling end point (SEP), a signaling transfer point (STP), a base station, a home subscriber server, a mobile management entity, a transfer point, and/or an evolved packet core (EPC) device. The node may be classified based on a type of the network (e.g., 3GPP network, 3G network, 4G network). The classification of the node may be stored, such as in the database of nodes. The classification may be stored with the signatures of the nodes.

The method 600 may further include identifying the node. For example, further communications may be received from the node. Based on packet headers, the signature may be generated. Based on the generated signature corresponding to the signature stored in the database, the node may be determined.

Figure 7:
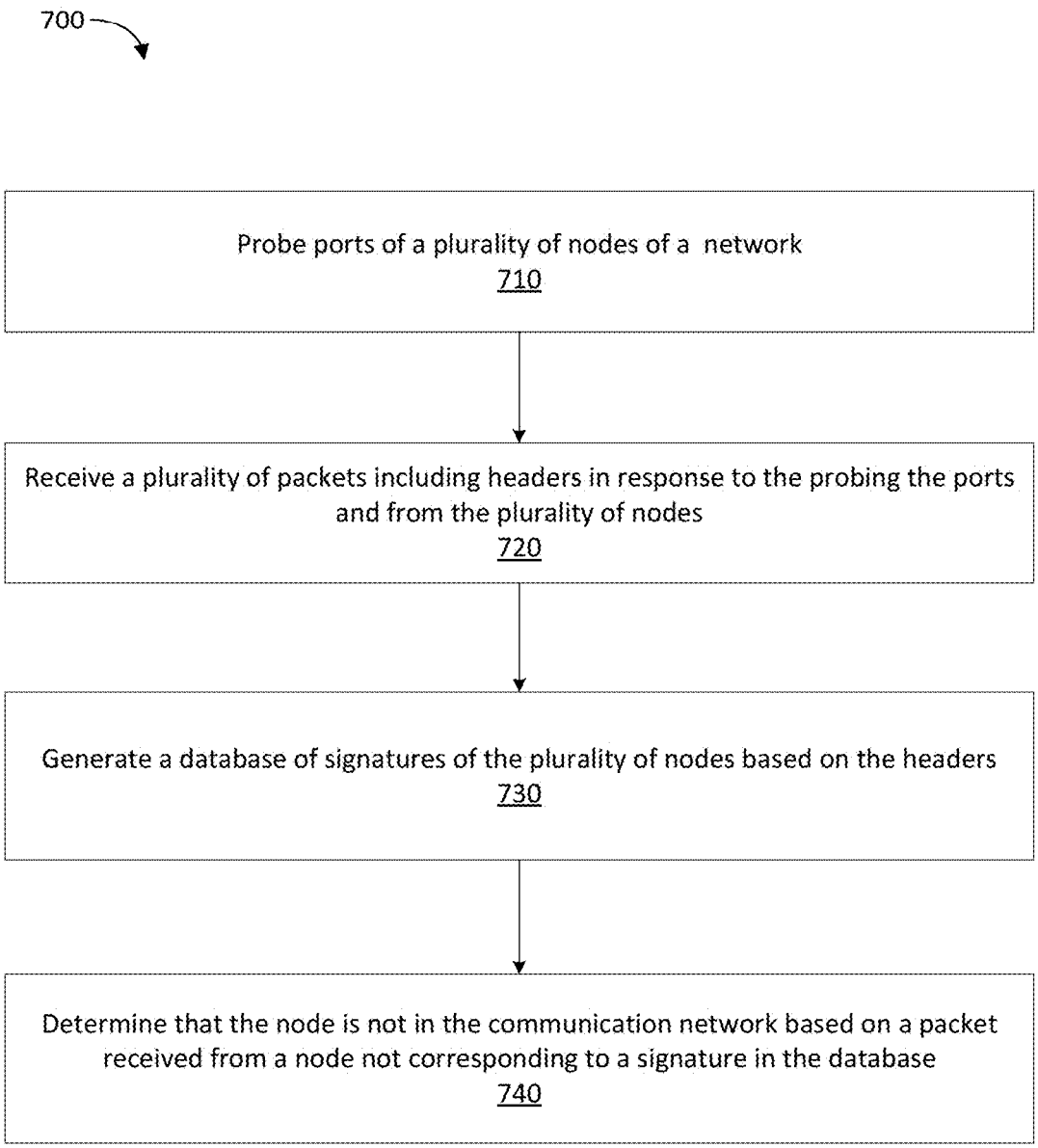
FIG. 7 illustrates a method according to an embodiment of the application.

FIG. 7 shows an example method 700. At step 710, ports of a plurality of nodes of a network may be probed. The network 101 may be a communications network, a computer network, a telephone network, and/or a data network. The network 101 may be a 3GPP network, a 3G network, or a 4G network. The ports of the nodes may be probed to determine which of the ports are open. The ports may be probed using an SCTP probe (e.g., an SCTP_INIT packet).

At step 720, a plurality of packets may be received from the nodes. The packets may be received in response to the probing the ports in step 710. The packets may each comprise fields. The fields may include headers. The headers may include an Advertised Receiver Window Credit header, a number of outbound streams header, a number of inbound streams header, and/or a transmission sequence number (TSN).

The method 700 may include classifying the nodes and/or the signatures of the nodes. The nodes may be classified based on their behavior and/or functions. For example the nodes may be classified as signaling gateways (SG), media gateway controllers (MGC), signaling end points (SEP), signaling transfer points (STP), base stations, home subscriber servers, mobile management entities, transfer points, and/or an evolved packet core (EPC) devices. The nodes may be classified based on a type of the network of the nodes (e.g., 3GPP network, 3G network, 4G network).

At step 730, a database of signatures of the nodes may be generated. The database of signature of the nodes may be generated based on the headers of the packets. The classifications of the nodes may be stored in the database. The method 700 may include mapping the nodes. Mapping the modes may include determining which of the probed nodes correspond to particular elements of the network.

At step 740, it may be determined that a node is not in the network. The node may be determined to not belong to the network based on a packet received from the node. Using one or more headers of the packet, a signature of the node may be generated. Based on the signature of the node not corresponding to a signature in the database, it may be determined that the node does not belong to the network. The node may be determined to not belong to the network based on the mapping. For example, it may be determined that the node does not correspond to any of the nodes that have been determined to constitute elements of the network.

Figure 8:
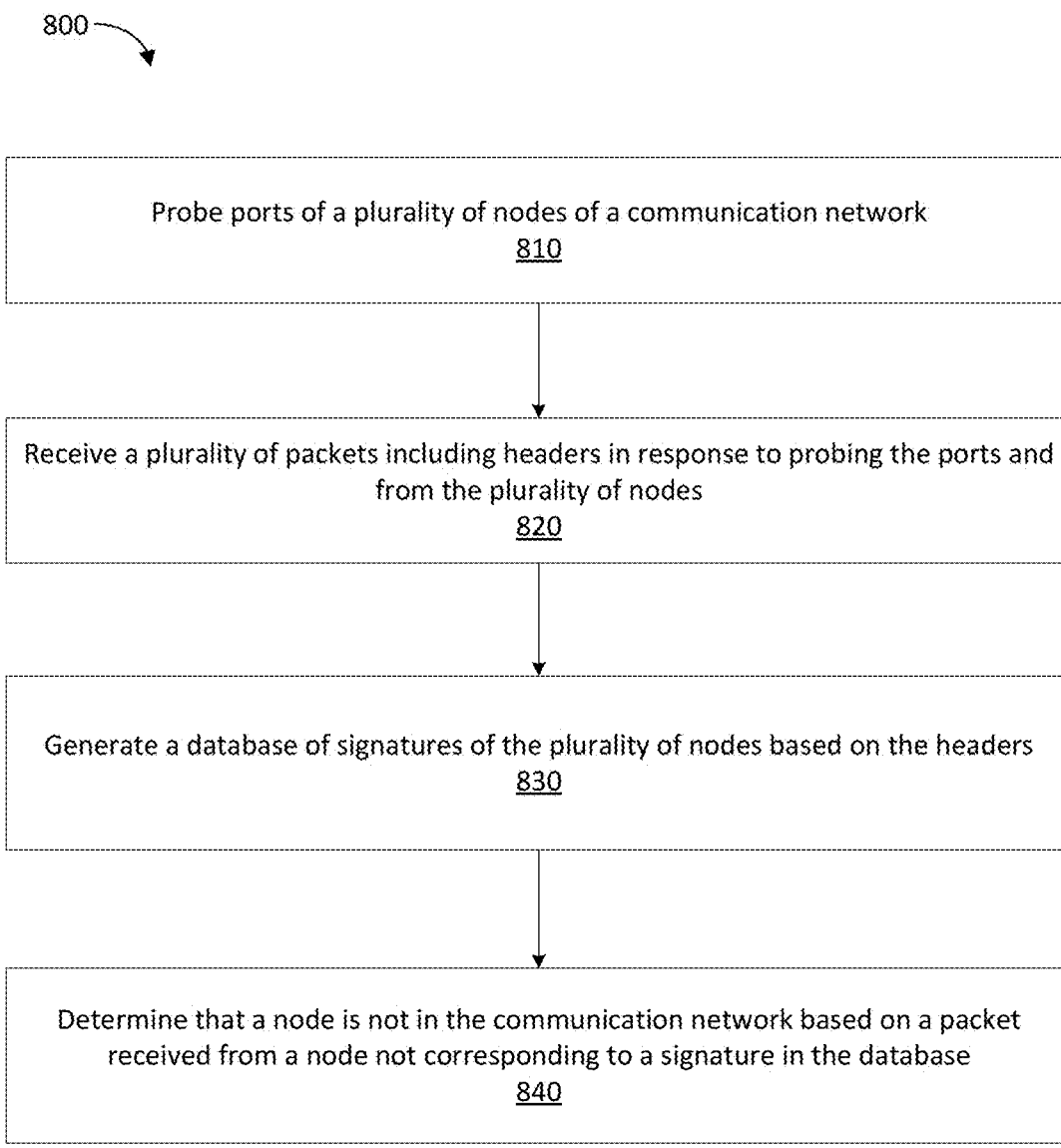
FIG. 8 illustrates a method according to an embodiment of the application.

FIG. 8 shows an example method 800. At step 810, ports of a plurality of nodes of a network may be probed. The network 101 may be a communications network, a computer network, a telephone network, and/or a data network. The network 101 may be a 3GPP network, a 3G network, or a 4G network. The ports may be probed to determine which of the ports are open. The ports may be probed by sending a packet to the ports (e.g., an SCTP_INIT packet).

At step 820, a plurality of packets may be received from the nodes. The packets may be received in response to probing the ports of the nodes. The packets may each have fields. The fields may include one or more headers. The headers may include an Advertised Receiver Window Credit header, a number of outbound streams header, a number of inbound streams header, and/or a transmission sequence number (TSN).

The method 800 may include classifying the nodes and/or signatures. The nodes may be classified based on their behavior and/or functions. For example the nodes may be classified as signaling gateways (SG), media gateway controllers (MGC), signaling end points (SEP), signaling transfer points (STP), base stations, home subscriber servers, mobile management entities, transfer points, and/or an evolved packet core (EPC) devices. The nodes may be classified based on a type of the network of the nodes (e.g., 3GPP network, 3G network, 4G network).

At step 830, a database of signatures of the nodes may be generated. Signatures may be generated based on the headers. The signatures may be stored in a database. The classifications of the nodes may be stored in the database.

At step 840, it may be determined that a node is not in the network based on a packet received from the node. A signature may be generated based on the packet. The database may be queried using the signature. It may be determined that the signature does not correspond to a signature in the database. Based on the signature not corresponding to a signature in the database, it may be determined that the node is not in the network.

Based on the determination that the node does not belong to the network, it may be determined that the node is a rogue device. An alert may be sent, such as to an administrator of the network. The alert may identify the rogue device and/or the behavior of the rogue device. The rogue device may be added to a list of rogue devices, such as a blacklist. The network may be monitored for the rogue devices. The rogue devices may be denied access to the network and/or other data.

The method 800 may further include authenticating another node. The node may be authenticated using the database. A packet may be received from the node. The database may be queried using the signature. It may be determined that the signature corresponds to a signature in the database. Based on the signature corresponding to a signature in the database, it may be determined that the node belongs to the network and/or that the node is known. Based on the node belonging to the network and/or being node, the node may be authenticated. Based on authenticating the node, the node may be granted permissions, such as communications or security permissions.

FIG. 9 shows an example blacklist 900. The blacklist 900 may include a database of rogue nodes. The blacklist 900 may include a table 910. The table 910 may include data identifying the rogue nodes, such as header data from communications sent by the rogue nodes and/or signatures of the rogue nodes. The data identifying the rogue nodes may include Advertised Receiver Window Credits (ARWC), numbers of outbound streams (NOS), and/or numbers of inbound streams (NIS). The data identifying the rogue nodes may include timestamps. The timestamps may each be associated with a time and/or date that the rogue device was added to the blacklist and/or was identified. The timestamps may each be associated with a time and/or date that a packet was received from the rogue node and/or that a network administrator was alerted of the rogue node.

A node may be added to the blacklist 900 based on a determination that the node is rogue. As an example, it may be determined that a node with an ARWC of 247573 is not authorized to communicate with and/or access a network. An alert of the rogue node may be sent to a network administrator. The network administrator may manage the blacklist. The network administrator may add the rogue node to the blacklist 900, based on the alert.

It may be determined that the blacklist 900 does not include an indication of the rogue node. The rogue node may be added to the table 910a, based on the determination that the rogue node is not in the table 910. Table 910b is an updated table, to which the rogue node has been added. The ARWC, NOS, and/or NIS of the node and/or the timestamp may be added to the table 910.

Figure 10:
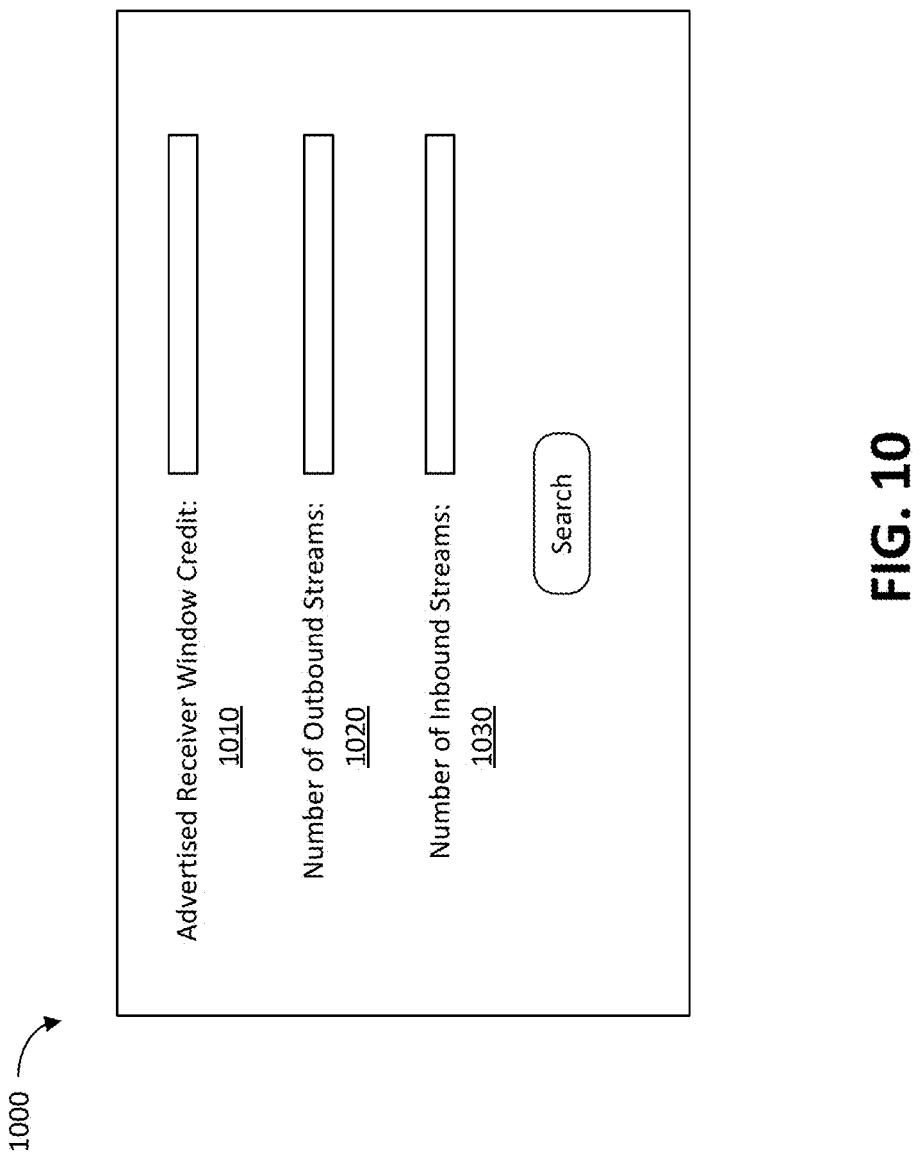
FIG. 10 illustrates a user interface according to an embodiment of the application.

FIG. 10 shows an example interface 1000. The interface 1000 may be output via a display (e.g., display 1386 in FIG. 13). The interface 1000 may be a user interface. The interface 1000 may be used to query a blacklist of rogue nodes (e.g., blacklist 900 in FIG. 9). The interface 1000 may be used to query a database of nodes, such as a database of authorized nodes or a database of identified nodes belonging to a network. The blacklist and/or database may be searched to determine whether to authenticate a node.

The interface 1000 may include search fields. The search fields may include an Advertised Receiver Window Credit (ARWC) search field 1010, a Number of Outbound Streams (NOS) search field 1020, and/or a Number of Inbound Streams (NIS) search field 1030. The interface 1000 may include a Search icon 1040. One or more values may be entered in one or more of the search fields.

Based on entry of a value and/or selection of the search icon 1040, the blacklist and/or database of nodes may be searched. The blacklist and/or database may be searched using the value. If a matching value is found in the blacklist and/or database, a result may be returned indicating that a node associated with the value is in the blacklist and/or database. If the blacklist and/or database is a blacklist of rogue nodes, the result may indicate that the node has been identified as a rogue node. If the blacklist and/or database is a database of identified nodes belonging to a network, the result may indicate that the node has been identified as a trusted node.

If no matching value is found in the blacklist and/or database, a result may be returned indicating that no node associated with the value is in the blacklist and/or database. If the blacklist and/or database is a blacklist of rogue nodes, the result may indicate that the node has not been identified as a rogue node. If the blacklist and/or database is a database of identified nodes belonging to a network, the result may indicate that the node has not been identified as a trusted node.

Figure 11:
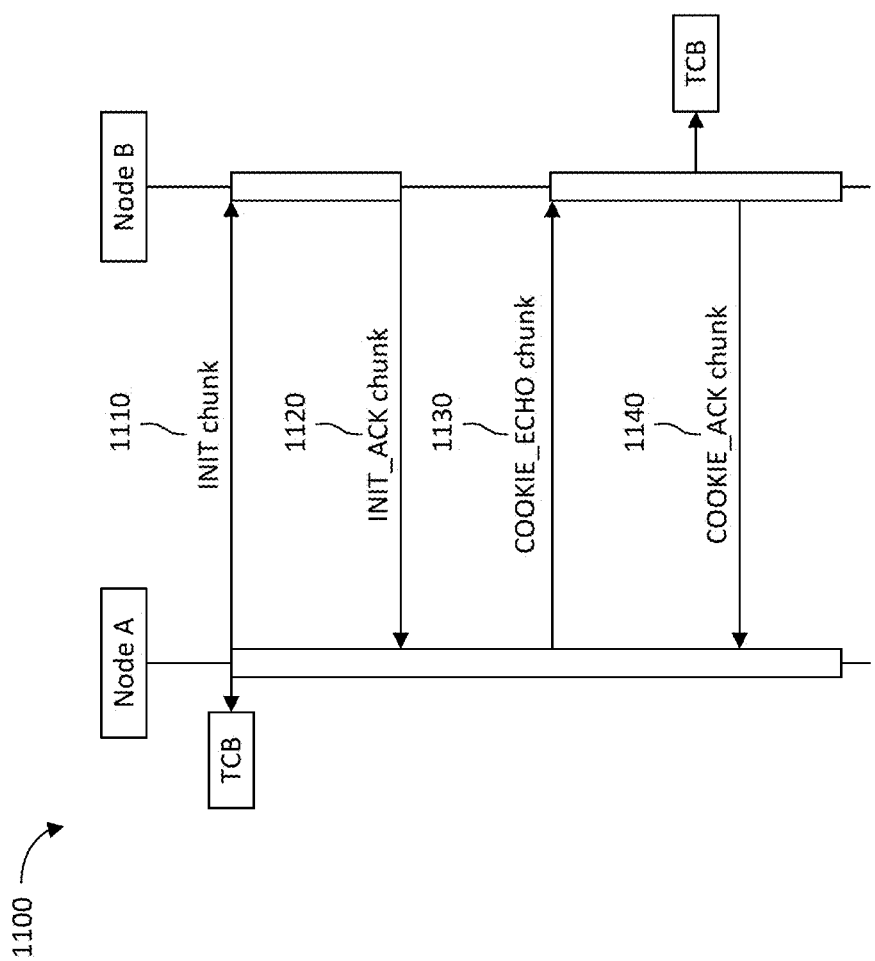
FIG. 11 illustrates a method according to an embodiment of the application.

FIG. 11 shows an example method 1100. The method 1100 may include a method of authenticating a node, such as a hand-shake protocol and/or an SCTP association startup method. The method 1100 may include an SCTP four-way handshake protocol. The method 1100 may include a handshake protocol between a Nodes A and a Node B. The Node A may be requesting to establish an SCTP association with the Node B, such as to communicate with the Node B and/or with a network of nodes associated with the Node B. The Node A may be a client device. The Node B may be a node in the network of nodes, an administrator of the network, a server, and/or an SCTP core mapper device (e.g., SCTP Core Mapper 106 in FIG. 1).

At step 1110, the Node B may receive a packet from the Node A. The packet may indicate a request to initiate an SCTP association. The packet may include an IN IT chunk. The packet may include an init tag.

Based on receiving the packet, the Node B may query a blacklist (e.g., blacklist 900 in FIG. 9) of rogue devices to determine if the Node A has been determined to be a rogue device. The Node B may query the blacklist using data from the packet received at step 1110, such as header data from the INIT chunk. Based on receiving a result of the query indicating that the Node A is in the blacklist, the Node B may determine not to respond to the Node A. Based on receiving no result to the query or a result indicating that the Node A is not in the blacklist, the Node B may send a packet to the Node A, as in step 1120 and/or may calculate a key.

Based on receiving the packet and/or querying the blacklist, the Node B may calculate a key. The key may be a state cookie. Calculating the state cookie may include determining a hash of a temporary transmission control block (TCB). The TCB may be stored on a lookup table. The Node A may not have access to the TCB and/or the lookup table. The state cookie may include a Message Authentication Code (MAC). The state cookie may include a time stamp indicating a time of creation of the state cookie and/or a lifespan of the state cookie. At this point, the Node B may not allocate connection resources to the communication with the node A. The Node B may delete the temporary TCB from its local memory.

At step 1120, the Node B may send a packet to the Node A, such as based on calculating the state cookie. The packet may include an initiation acknowledgement (INIT_ACK) chunk. The packet may include the calculated state cookie.

At step 1130, the Node A may send a packet to the Node B, such as in response to the packet sent in step 1120. The packet may include a chunk including the state cookie from the packet sent in step 1120, such as a COOKIE_ECHO chunk. The packet may include user payload data, such as user DATA chunks. The user payload data may be bundled with the cookie, such as under the same SCTP header.

The Node B may determine that the state cookie in the packet sent in step 1130 matches the state cookie calculated in step 1120. Based on the cookies matching, the Node B may allocate resources, such as a TCB, for the SCTP association with the Node A.

At step 1140, the Node B may send a packet to the Node A, such as based on allocating the TCB for the SCTP association with the Node A. The packet may include a cookie acknowledgement (COOKIE_ACK) chunk. The packet may acknowledge receipt of the packet sent in step 1130. The packet may include user payload data, such as user DATA chunks. The user payload data may be bundled with the COOKIE_ACK chunk. Based on the Node B sending the packet to the Node A, an SCTP association may be established between the Node A and the Node B.

Figure 12:
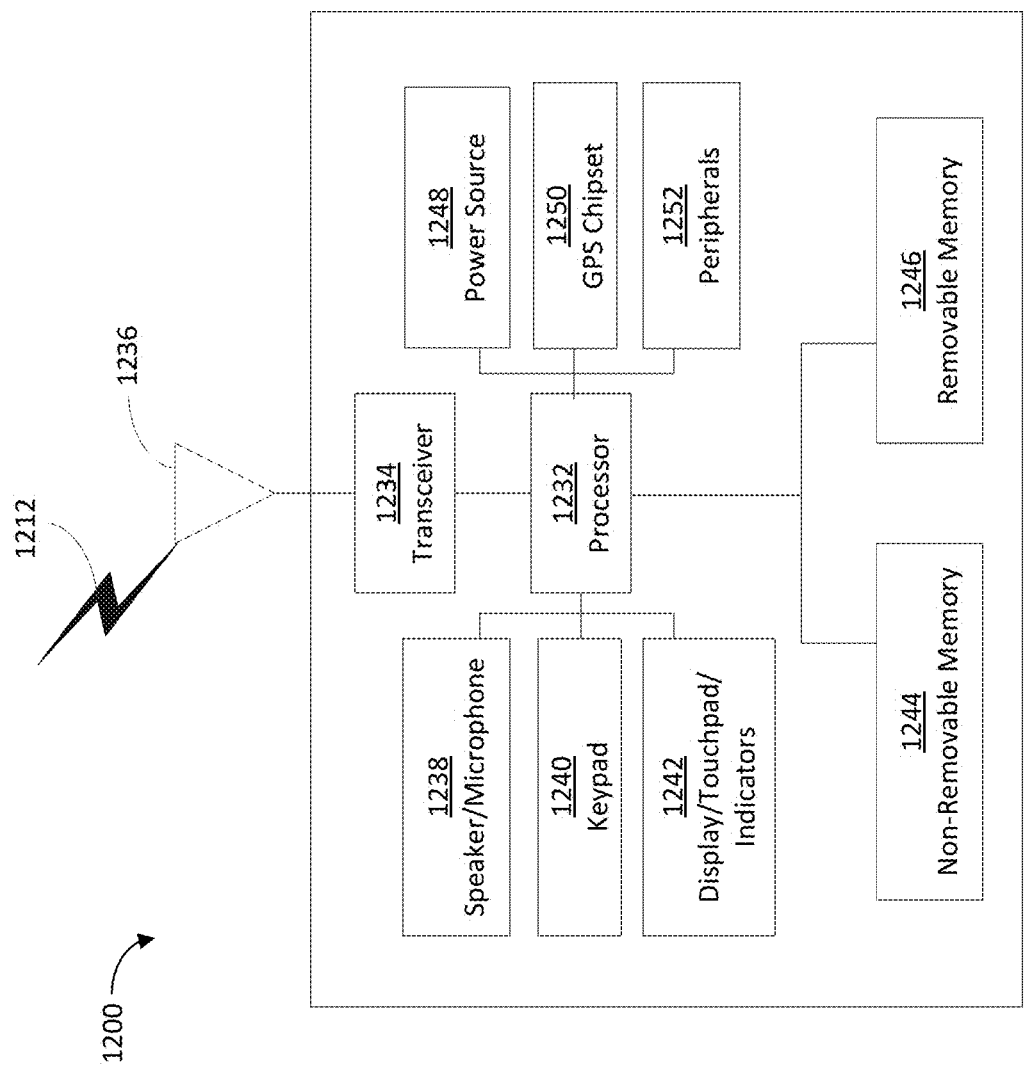
FIG. 12 illustrates a node according to an embodiment of the application.

FIG. 12 shows an example hardware/software architecture of a node 1200 of a network (e.g., a node of the network 101 in FIG. 1). As shown in FIG. 12, the node 1200 may include a processor 1232, non-removable memory 1244, removable memory 1246, a speaker/microphone 1238, a keypad 1240, a display, touchpad, and/or indicators 1242, a power source 1248, a global positioning system (GPS) chipset 1250, and other peripherals 1252. The node 1200 may also include communication circuitry, such as a transceiver 1234 and a transmit/receive element 1236. The node 1200 may include any sub-combination of the foregoing elements. This node may be a node that implements any of the methods described herein (e.g., methods 600 in FIG. 6, 700 in FIG. 7, and/or 800 in FIG. 8).

The processor 1232 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 1232 may execute computer-executable instructions stored in the memory (e.g., memory 1244 and/or memory 1246) of the node in order to perform the various required functions of the node. For example, the processor 1232 may perform signal coding, data processing, power control, input/output processing, and/or any other functionality that enables the node 1200 to operate in a wireless or wired environment. The processor 1232 may run application-layer programs (e.g., browsers) and/or radio access-layer (RAN) programs and/or other communications programs. The processor 1232 may also perform security operations such as authentication, security key agreement, and/or cryptographic operations, such as at the access-layer and/or application layer for example.

As shown in FIG. 12, the processor 1232 may be coupled to communication circuitry (e.g., transceiver 1234 and/or transmit/receive element 1236). The processor 1232, through the execution of computer executable instructions, may control the communication circuitry in order to cause the node 1200 to communicate with other nodes via the network to which it is connected. In particular, the processor 1232 may control the communication circuitry in order to perform the methods described herein. While FIG. 12 depicts the processor 1232 and the transceiver 1234 as separate components, it will be appreciated that the processor 1232 and the transceiver 934 may be integrated together in an electronic package or chip.

The transmit/receive element 1236 may transmit signals to, or receive signals from, other nodes, including M2M servers, gateways, device, and the like. For example, in an embodiment, the transmit/receive element 1236 may be an antenna configured to transmit and/or receive RF signals. The transmit/receive element 1236 may support various networks and air interfaces, such as WLAN, WPAN, and/or cellular. In an embodiment, the transmit/receive element 1236 may be an emitter/detector configured to transmit and/or receive IR, UV, or visible light signals, for example. In yet another embodiment, the transmit/receive element 1236 may transmit and receive both RF and light signals. It will be appreciated that the transmit/receive element 1236 may be configured to transmit and/or receive any combination of wireless or wired signals.

In addition, although the transmit/receive element 1236 is depicted in FIG. 12 as a single element, the node 1200 may include any number of transmit/receive elements 1236. More specifically, the node 1200 may employ MIMO technology. Thus, in an embodiment, the node 1200 may include two or more transmit/receive elements 1236 (e.g., multiple antennas) for transmitting and receiving wireless signals.

The transceiver 1234 may be configured to modulate the signals that are to be transmitted by the transmit/receive element 1236 and to demodulate the signals that are received by the transmit/receive element 1236. As noted above, the node 1200 may have multi-mode capabilities. Thus, the transceiver 1234 may include multiple transceivers for enabling the node 1200 to communicate via multiple RATs, such as UTRA and IEEE 802.11, for example.

The processor 1232 may access information from, and store data in, any type of suitable memory, such as the non-removable memory 1244 and/or the removable memory 1246. For example, the processor 1232 may store session context in its memory, as described above. The non-removable memory 1244 may include random-access memory (RAM), read-only memory (ROM), a hard disk, or any other type of memory storage device. The removable memory 1246 may include a subscriber identity module (SIM) card, a memory stick, a secure digital (SD) memory card, and the like. In other embodiments, the processor 1232 may access information from, and store data in, memory that is not physically located on the node 1230, such as on a server or a home computer. The processor 1232 may be configured to control lighting patterns, images, or colors on the display or indicators 1242.

The processor 1232 may receive power from the power source 1248, and may be configured to distribute and/or control the power to the other components in the node 1200. The power source 1248 may be any suitable device for powering the node 1200. For example, the power source 1248 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 1232 may also be coupled to the GPS chipset 1250, which is configured to provide location information (e.g., longitude and latitude) regarding the current location of the node 1200. It will be appreciated that the node 1200 may acquire location information by way of any suitable location-determination method.

The processor 1232 may further be coupled to other peripherals 1252, which may include one or more software and/or hardware modules that provide additional features, functionality, and/or wired or wireless connectivity. For example, the peripherals 1252 may include various sensors such as an accelerometer, biometrics (e.g., finger print) sensors, an e-compass, a satellite transceiver, a sensor, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The node 1200 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The node 1200 may connect to other components, modules, or systems of such apparatuses or devices via one or more interconnect interfaces, such as an interconnect interface that may include one of the peripherals 1252.

Figure 13:
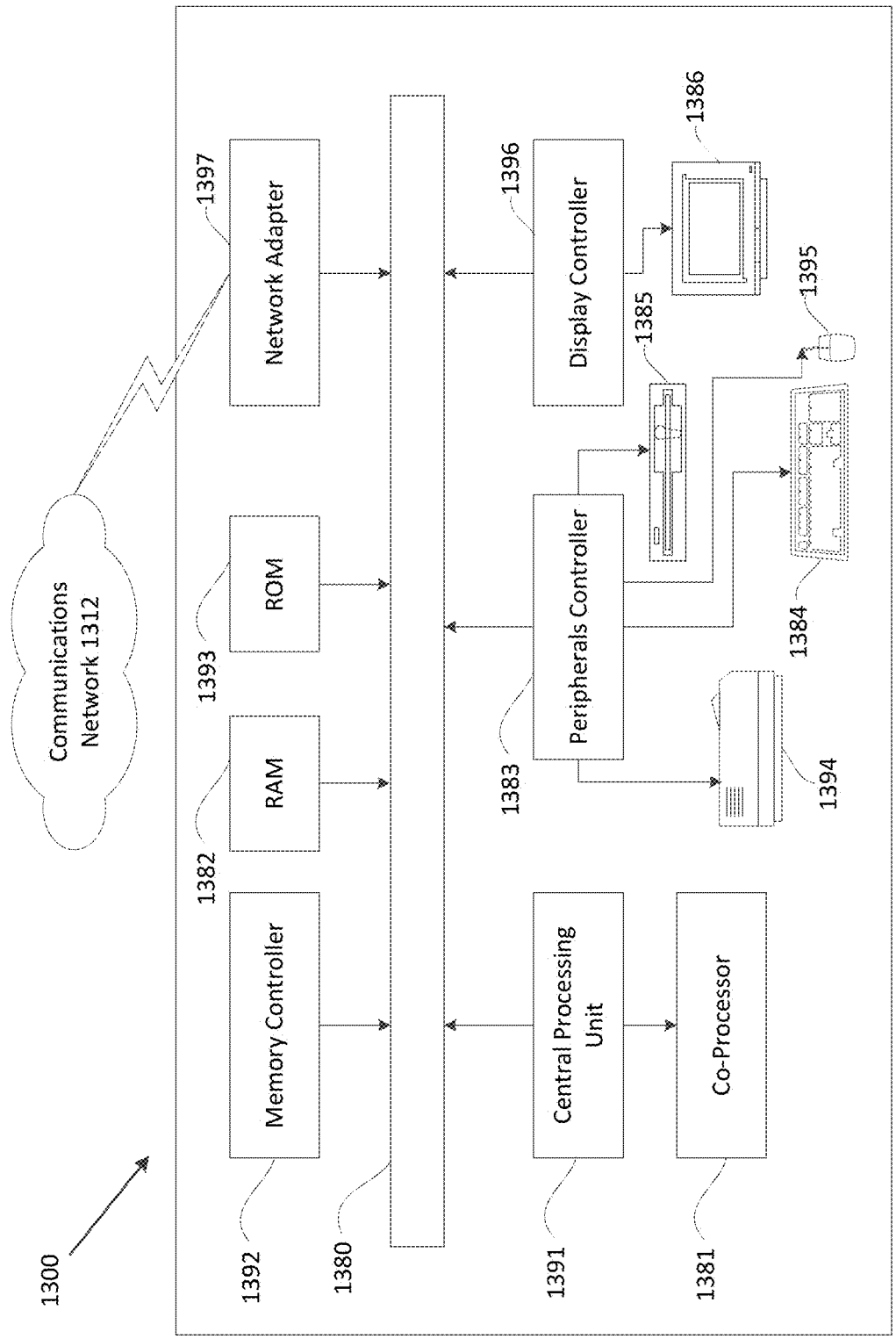
FIG. 13 illustrates a system according to an embodiment of the application.

FIG. 13 shows an example computing system 1300 which may also be used to implement one or more nodes of a network (e.g., the nodes of the network 101 in FIG. 1).

Computing system 1300 may include a computer or server and may be controlled primarily by computer readable instructions, which may be in the form of software, wherever, or by whatever means such software is stored or accessed. Such computer readable instructions may be executed within a processor, such as central processing unit (CPU) 1391, to cause computing system 1300 to do work. In many known workstations, servers, and personal computers, central processing unit 1391 is implemented by a single-chip CPU called a microprocessor. In other machines, the central processing unit 1391 may have multiple processors. Coprocessor 1381 is an optional processor, distinct from main CPU 1391, that performs additional functions or assists CPU 1391. CPU 1391 and/or coprocessor 1381 may receive, generate, and process data related to the disclosed systems and methods for E2E M2M Service Layer sessions, such as receiving session credentials or authenticating based on session credentials.

In operation, CPU 1391 fetches, decodes, and executes instructions, and transfers information to and from other resources via the computer's main data-transfer path, system bus 1380. Such a system bus connects the components in computing system 1300 and defines the medium for data exchange. System bus 1380 typically includes data lines for sending data, address lines for sending addresses, and control lines for sending interrupts and for operating the system bus. An example of such a system bus 1380 is the PCI (Peripheral Component Interconnect) bus.

Memories coupled to system bus 1380 include random access memory (RAM) 1382 and read only memory (ROM) 1393. Such memories include circuitry that allows information to be stored and retrieved. ROMs 1393 generally contain stored data that cannot easily be modified. Data stored in RAM 1382 may be read or changed by CPU 1391 or other hardware devices. Access to RAM 1382 and/or ROM 1393 may be controlled by memory controller 1392. Memory controller 1392 may provide an address translation function that translates virtual addresses into physical addresses as instructions are executed. Memory controller 1392 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 1300 may contain peripherals controller 1383 responsible for communicating instructions from CPU 1391 to peripherals, such as printer 1394, keyboard 1384, mouse 1395, and disk drive 1385.

Display 1386, which is controlled by display controller 1396, is used to display visual output generated by computing system 1300, such as the interface 1000 in FIG. 10. Such visual output may include text, graphics, animated graphics, and video. Display 1386 may be implemented with a CRT-based video display, an LCD-based flat-panel display, gas plasma-based flat-panel display, or a touch-panel. Display controller 1396 includes electronic components required to generate a video signal that is sent to display 1386.

Further, computing system 1300 may contain communication circuitry, such as for example a network adaptor 1397, that may be used to connect computing system 1300 to an external communications network (e.g., the network 101 in FIG. 1) to enable the computing system 1300 to communicate with other nodes of the network.

While the systems and methods have been described in terms of what are presently considered to be specific aspects, the application need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

What is claimed:

1. A method comprising:
 determining, by a mapper device, an open port of a node of a communication network using a port scanning probe;
 sending, to the open port, a first packet;
 receiving, from the node, a second packet including a header in response to the first sent packet;
 generating, based on the header, a signature of the node;
 classifying the signature based on a type of the communication network or an operating system of the node.

2. The method of claim 1, wherein
 the classifying the signature step is based on a function of the node.

3. The method of claim 2, wherein the function of the node comprises at least one of a signaling gateway, a media gateway controller, and a packet data network (pdn) gateway.

4. The method of claim 1, wherein the first packet comprises a SCTP_INIT request and the second packet comprises a INIT_ACK response.

5. The method of claim 1, wherein the header comprises a transmission sequence number.

6. The method of claim 1, further comprising:
 determining if the signature is stored in a database; and
 storing the signature in the database based upon signature not being in the database.

7. The method of claim 6, further comprising:
 identifying the node using the database.

8. A device comprising:
 a processor; and
 a memory comprising instructions that, when executed by the processor, cause the processor to:
  send a Stream Control Transmission Protocol (SCTP) probe to an open port of a node of a communication network;
  receive, from the node, a packet including a header in response to the SCTP probe;
  generate, based on the header, a signature of the node; and
  classify the signature based on at least two of a function of the node, type of the communication network, and an operating system of the node.

9. The device of claim 8, wherein the header comprises an advertised receiver window credit.

10. The device of claim 8, wherein the header comprises a number of outbound streams and a number of inbound streams.

11. The device of claim 8, wherein the instructions, when executed, further cause the processor to:
 map devices in the communication network using generated signatures; and
 determining that an element is not in the communication network based on the mapping.

12. The device of claim 8, wherein the instructions, when executed, further cause the processor to store a classification of the node in a database of elements of the communication network.

13. A method comprising:
 receiving, from a device in a communication network, a first packet having a header;
 determining, based on the header, a signature of the device based on a type of the communication network or an operating system of the device;
 querying a database of compiled signatures of nodes of the communication network for the signature of the device, where the compiled signatures are based on headers of packets received in response to probing the nodes;
 determining the signature of the device is not in the database;
 determining a characteristic of the signature of the device is different from a shared characteristic of the compiled signatures of the nodes in the database; and
 generating an alert that the device in the communication network is rogue.

14. The method of claim 13, further comprising authenticating another device in the communication network using the database.

15. The method of claim 13, wherein the characteristic of the signature of the device comprises a characteristic of the header.

16. The method of claim 13, further comprising:
 adding the device to a list of rogue devices; and
 monitoring the communication network for the rogue devices.

17. The method of claim 13, further comprising:
 alerting an administrator of the communication network of the rogue device.

18. The method of claim 13, wherein the characteristic comprises a classification of the signature based on a type of element of the communication network.

19. The method of claim 18, wherein the type of the element of the communication network comprises at least one of a base station, a home subscriber server, a mobile management entity, and a transfer point.

20. The method of claim 18, wherein the type of the element of the communication network comprises a part of an evolved packet core (EPC).

* * * * *